(No Model.)
H. STEVENS.
REVERSING VALVE.
No. 323,462. Patented Aug. 4, 1885.
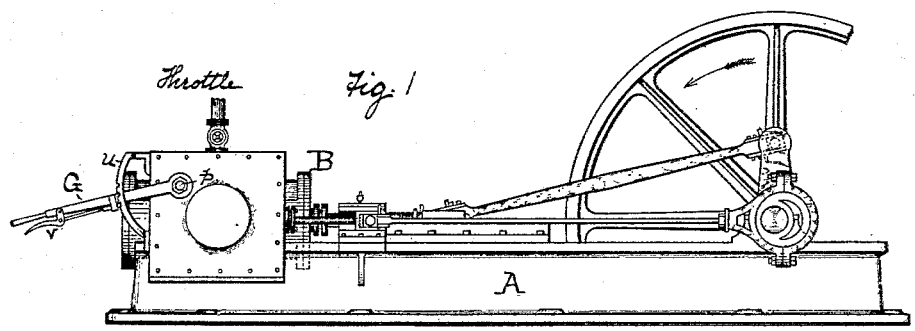
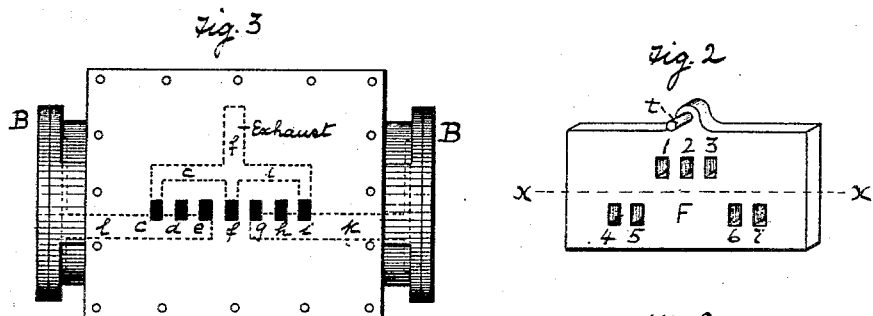
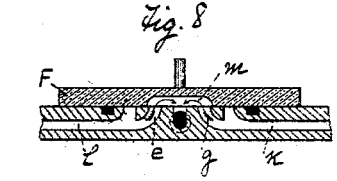
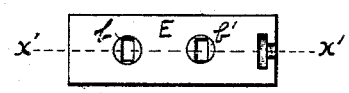
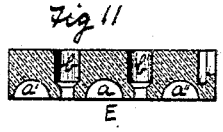
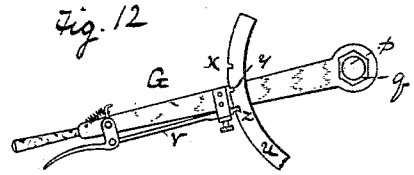
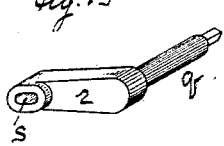
Witnesses
J. A. Burns.
J. K. Smith
Inventor
Hermann Stevens
by his attorneys
Bakewell & Kerr (No Model.) 2 Sheets—Sheet 2.
H. STEVENS.
REVERSING VALVE.
No. 323,462. Patented Aug. 4, 1885.
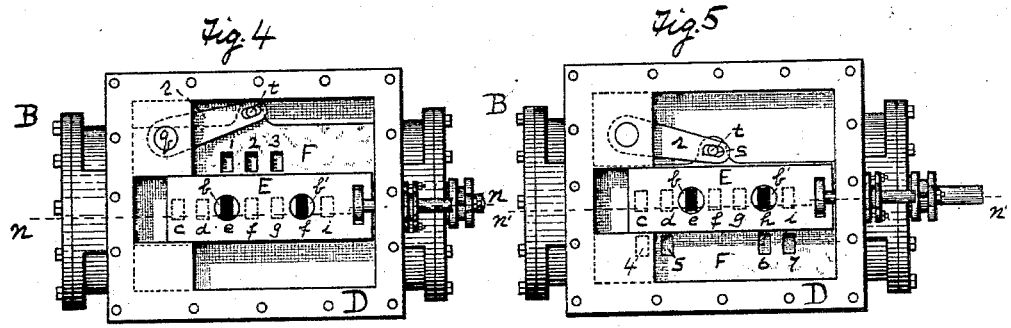
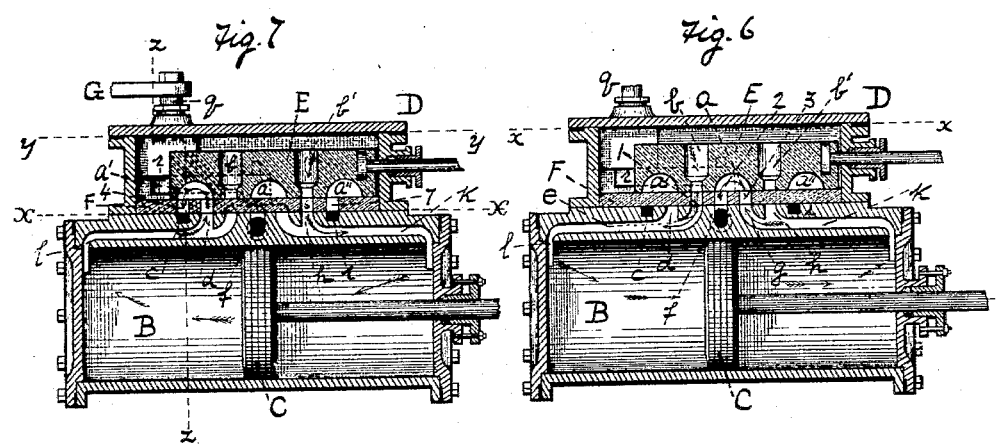
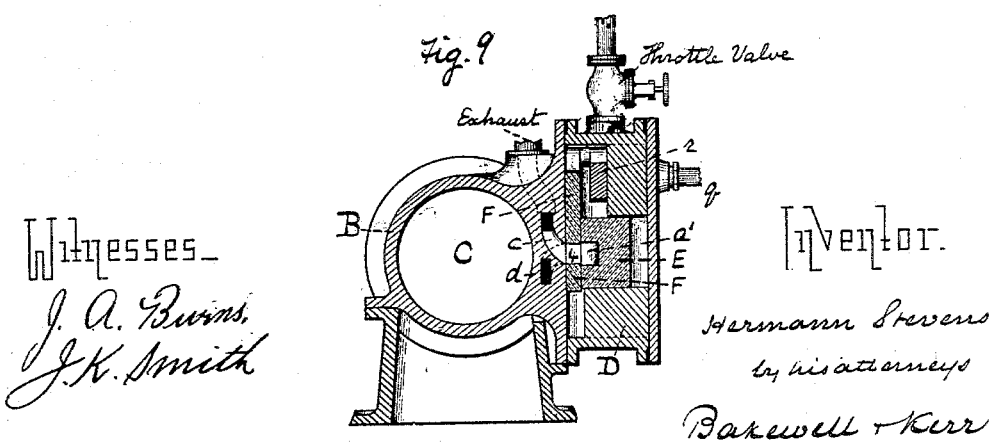
Witnesses—
J. A. Burns
J. K. Smith
Inventor.
Hermann Stevens
by his attorneys
Bakewell & Kerr

# UNITED STATES PATENT OFFICE.

HERMANN STEVENS, OF HOMESTEAD, PENNSYLVANIA.

REVERSING-VALVE.

SPECIFICATION forming part of Letters Patent No. 323,462, dated August 4, 1885.

Application filed January 22, 1885. (No model.)

*To all whom it may concern:*

Be it known that I, HERMANN STEVENS, of Homestead, in the county of Allegheny and State of Pennsylvania, have invented a new and useful Improvement in Reversing-Valves for Engines; and I do hereby declare the following to be a full, clear, and exact description thereof, reference being had to the accompanying drawings, in which—

Figure 1 is a side elevation of a steam-engine fitted with my improvement. Fig. 2 is a perspective view of the reversing-diaphragm. Fig. 3 is a plan view of the steam-cylinder, showing the seat on which the diaphragm works, on the line $x\ x$ of Fig. 7. Fig. 4 is a plan view of the cylinder and valve-chest on the line $y\ y$ of Fig. 7, showing the interior of the valve-chest and the diaphragm in the same position as in Fig. 7. Fig. 5 is a similar view to Fig. 4 on line $x\ x$ of Fig. 6, showing the interior of the valve-chest and the diaphragm when shifted to the position shown in Fig. 6. Figs. 6, 7, and 8 are longitudinal sections of the cylinder and valve-chest on the lines $n\ n$ and $n'\ n'$ of Figs. 4 and 5, showing the diaphragm in three different positions, Figs. 6 and 7 showing the change required to reverse the motion of the engine, and Fig. 8 the position of the diaphragm when the steam is cut off from the engine. Fig. 9 is a vertical cross-section of the cylinder and valve-chest on the line $z\ z$ of Fig. 7. Fig. 10 is a plan or top view of the slide-valve. Fig. 11 is a vertical section of the slide-valve on the line $x'\ x'$ of Fig. 10. Fig. 12 is a representation of the reversing-lever and trigger-latch. Fig. 13 is a perspective representation of the crank and crank-shaft by means of which the diaphragm is shifted by operating the reversing-lever.

In the several figures like letters of reference indicate the same parts.

The ordinary device for reversing steam-engines at present in use is that of the link-motion, by means of which, by raising or lowering the link, the direction of the motion communicated by the eccentric or cam to the spindle of the slide-valve is reversed, thereby reversing also the motion of the piston of the steam-cylinder; or by means of the same device, by placing the link in such position that the point of connection of the spindle of the slide-valve on the link is midway between the pivotal points of the eccentric-rods on the link, the slide-valve is brought to rest, and the steam is shut off from the engine; or by shifting the position of the link more or less the steam is more or less cut off from the cylinder. This device, however excellent and efficient in itself, is open to several serious objections in its practical operation, being hard to operate, and requiring the exercise of considerable force. It also involves the use of somewhat complicated machinery, which is liable to get out of order, and adds considerably to the cost of construction.

My improved device obviates all of these objections, is very simple in construction, very easy to operate, acts more promptly than the link-motion, and by dispensing entirely with the link devices reduces the cost of engines very greatly.

As already stated, the link-motion device operates to reverse the engine by reversing the motion of the slide-valve of the engine. My improved device operates to reverse the motion of the engine without changing or in any way interfering with the motion of the slide-valve, and it also operates to shut off the steam or vary the amount of steam admitted to the steam-cylinder as effectually as the link-motion does.

To enable others skilled in the art to construct and use my improvement, I will proceed to describe its construction and operation.

As before stated, I dispense entirely with the link and its connections, and the spindle of the slide-valve may be connected directly with the cam-yoke or eccentric by which its reciprocating motion is produced; and I produce the desired effect of reversing the direction of motion of the piston of the engine or of cutting off or shutting off the steam by a modification in construction of the slide-valve.

In the accompanying drawings, A is the bed-plate of the steam-engine. The engine itself may be of any desired construction, to which a slide-valve is applicable for admitting steam, and therefore it needs no further description, the only modification being in the slide-valve and the addition of a diaphragm thereto.

In Figs. 6 and 7 of the drawings a longitudinal section is given of the steam-cylinder of the engine, and of the steam-chest and slide-valve, Fig. 6 showing the position of the parts on the upstroke of the piston, Fig. 7 their position on the downstroke, and Fig. 8 their position when the steam is entirely shut off from the engine.

In the several figures, B is the cylinder, C the piston, D the steam-chest, and E the slide-valve. All of these parts are of the usual construction, excepting that the slide-valve E is furnished with two additional exhaust-ports, $a'$ $a''$, and their steam-passages from the cylinder, $a$ being the ordinary exhaust-port. Between the lower face of the slide-valve and the cylinder I interpose a diaphragm, F, the shape and construction of which are shown in Fig. 2. This diaphragm is simply an iron plate of sufficient thickness, planed smooth on both faces, so as to work easily and steam-tight. It has seven holes, (marked consecutively from 1 to 7 in Fig. 2,) which extend clear through the plate. Three of these (1, 2, and 3) are placed above the other four, (4, 5, 6, and 7,) and at such a distance above them as to leave a blank or imperforate space of at least the same width as the diameter of the steam-passages in the cylinder B, leading to the slide-valve E, so that if the diaphragm F is placed with the line $x$ $x$ of Fig. 2 coincident with the center of the steam-passages, all communication between the steam-chest and the cylinder B is closed. When the upper row of holes, 1, 2, and 3, in the diaphragm F coincide with the steam-passages $e$ $f$ $g$ to the steam-cylinder B, as in Fig. 6, if the slide-valve is in the position shown in that figure, steam from the valve-chest D enters the cylinder through the adit or port $b$, through hole 1 in the diaphragm F, and through branch passage $e$ and passage $l$ to the lower rear end of the cylinder, causing the upstroke or outstroke of the piston, while the exhaust-steam from the upper or forward end of the cylinder traverses the passage K and the branch passage $g$ through hole 3 in the diaphragm F and exhaust-opening $a$ in the slide-valve, and then through hole 2 in the diaphragm F to the exhaust-port $f$. When the slide-valve is shifted for the instroke, the steam enters the upper or outer end of the cylinder B at the adit or port $b'$, through the hole 3 in diaphragm F, and thence through branch $g$ and passage K, while the exhaust-steam passes out through passage $l$, branch $e$, hole 1 in the diaphragm F, exhaust-opening $a$ in the slide-valve, and through hole 2 in the diaphragm to the exhaust-port $f$.

When the slide-valve is in the position first above described, as shown in Figs. 6 and 7, if the diaphragm F be shifted so as to bring the lower row of holes, 4, 5, 6, and 7, Fig. 2, in line with the adit and exhaust openings in the slide-valve, as shown in Fig. 7, the passage of the live steam into and of the exhaust-steam out of the cylinder is reversed, and the live steam enters the upper or forward end of the cylinder B through adit $b'$ of the slide-valve, hole 6 of diaphragm F, branch $h$, and passage K, while the exhaust-steam passes out of the rear end of cylinder B, through passage $l$, branch $d$, and hole 5 in diaphragm F, to the exhaust-passage $a'$ in the slide-valve E, and then through hole 4 in diaphragm F to the exhaust-port $c$. On the reverse stroke of the slide-valve E live steam enters the rear end of the cylinder B from the steam-chest, through adit $b$, hole 5 in diaphragm F, branch $d$, and passage $l$, while steam from the forward end of the cylinder exhausts through passage K and hole 6 in diaphragm F into exhaust-opening $a$ in the slide-valve, and thence through hole 7 in the diaphragm and out at the exhaust-port $i$.

As already stated, if the reversing-diaphragm F be shifted to a position in which the space between the two series of holes shall be in line with the steam-passages, as in Fig. 8, the steam from the valve-chest will be then entirely cut off from the cylinder. As, however, it is necessary to provide some escape for the steam from both ends of the cylinder, so as to permit of the continuance of the strokes of the piston until the engine can be brought to rest without rupture of the cylinder, I provide a groove, $m$, in the face of the diaphragm F nearest to the cylinder, and extending from the port $e$ (which communicates by the passage $l$ with the rear end of the cylinder) to the port $g$, (which communicates by the passage K with the forward end of the cylinder,) so that when the communication between the steam-chest of the sliding valve and the steam-ports of the cylinder is closed the steam on either side of the piston C of the cylinder B may pass from one end to the other of the cylinder through the passages K and $l$, the ports $e$ and $g$, and the groove $m$.

From the foregoing description it will be seen that in order to reverse the engine no arrest or change of direction of motion of the sliding valve is necessary, it being only necessary to shift the reversing-diaphragm F sufficiently to bring the other row of holes in the diaphragm F in line with the steam-passages of the slide-valve and cylinder. If it is desired to cut off the steam from the cylinder, one-half of the motion of the diaphragm F only is necessary, so as to bring the groove $m$, which is located between the two rows of holes, in line with the branch passages $e$ and $g$ of the cylinder. In case it is desired to cut off a portion of the steam, this is effected by a slight motion of the diaphragm, so that the row of holes of the diaphragm F which may be in connection with the steam-passages of the steam-valve and cylinder shall not be entirely coincident therewith, but that they may be partially covered by the diaphragm.

It remains only to explain how the described motion of the diaphragm is effected. Various devices might be used for this purpose; but a convenient and I think the most simple and efficient way is to operate the diaphragm by means of a lever, G, very similar to the reversing-lever commonly used on locomotives. This lever may be located in any position convenient to the engineer, and in locomotives in the usual position in the cab.

Fig. 1 illustrates the position and operation of the reversing-lever G. It is attached at $p$ to the spindle $q$ of a crank, $r$, (see Fig. 12,) so that as the lever G is raised or lowered on its center of motion $p$ it turns the spindle $q$ on its axis, and raises or lowers the free end of the crank $r$, which has an oblong slot, $s$, into which is inserted a pin, $t$, projecting from one side of the upper edge of the diaphragm F. From this construction it is obvious that as the lever-arm G is raised or lowered it correspondingly lowers or raises the diaphragm F if it is placed vertically, or shifts it to one side or the other if it is placed in a horizontal position. The lever G moves between a pair of quadrant or sector bars, $u$, which are provided with notches on the face of the arc, into which the ordinary trigger-latch, $v$, works, so as to lock the reversing-lever G in any desired position.

In the drawings, Fig. 12, three notches, $x$ $y$ $z$, only are represented. When the trigger-latch $v$ engages one of the notches $x$, as in Fig. 12, the diaphragm F is raised or shifted so as to bring the holes 4, 5, 6, and 7 in line with the steam-passages of the sliding valve E and cylinder B. When the trigger-latch $v$ engages the notch $z$, the other row of holes, 1 2 3, are in connection with the steam-passages, and when the trigger-latch engages the middle notch, $y$, the connection between the steam-chest of the sliding valve and the cylinder is closed. It is intended that other notches be made in the arc of one of the sector-bars $u$, so as to lock the lever G in any desired position to cut off more or less steam from the engine-cylinder B.

My invention is specially applicable to the engines of locomotives, as it simplifies greatly the construction, is much less liable to get out of order than any of the link-motions in use, is more rapid in action, and requires much less force to operate. These advantages are also important in stationary and marine engines, to which my invention is equally applicable.

I have described my invention as applied to a sliding valve having a plane-surfaced seat and a rectilinear motion. It is, however, applicable to engines having slide-valves or rotary valves in which the valve-seat is curved.

If applied to a cylindrical valve, the diaphragm F may be made in the shape of a hollow cylinder with suitable apertures, and either the slide-valve on the cylindrical casing, which performs the functions of the diaphragm F, may be rotated partially on its axis to effect the result of reversing or cut-off.

These changes of construction will be obvious to any skilled mechanic, and are within the scope and purpose of my invention.

The operation of the sliding valve of steam-engines as ordinarily constructed depends on making the adit-ports in the cylinder on one stroke of the piston of the engine become the exhaust-ports on the return stroke, by giving a reciprocating motion to the slide-valve corresponding with the strokes of the piston of the engine, so that the stroke of the piston follows the stroke of the valve, moving either in the same or in opposite directions, depending on the construction of the valve and the arrangement of its ports and passages; hence the ordinary way of reversing the motion of the engine is to reverse the stroke of the slide-valve, which, as before stated, is ordinarily effected by a link-motion.

The distinguishing characteristic of my improvement is, that the direction of stroke of the slide-valve remains unchanged, and that the reversing of the engine is effected by means of a perforated diaphragm or plate which closes the adit and exhaust-steam passage used before the reversal, and opens communication between other adit and exhaust passages or ports in the cylinder and corresponding passages and ports in the sliding valve, so arranged that what was previously the steam-adit communicating with one end of the cylinder shall now be closed, and another adit for steam from the valve-chest, communicating with the other end of the cylinder, shall be opened, and in like manner what was formerly the exhaust-port shall be closed and another exhaust-port connecting with the opposite end of the cylinder be opened, and vice versa for the return-stroke of the sliding valve.

As my improvement is designed for use, as before stated, in engines having plane-faced sliding valves, or cylindrical or partially-cylindrical valves having either longitudinal motion or motion of rotation or partial rotation on their axes, I desire it to be understood that by the term "sliding valve" in the following claims I intend to include valves of either of the constructions just indicated, and by the term "diaphragm" a cylinder, partial cylinder, or plane.

I do not desire to claim, broadly, a sliding valve in combination with a perforated sliding plate situate between the valve-chamber and the cylinder-ports.

Having described my improvement, what I claim therein as my invention, and desire to secure by Letters Patent, is—

1. As a device for reversing the motion of slide-valve steam-engines, a movable perforated diaphragm interposed between the face of the slide-valve and its seat, said diaphragm having two or more series of holes so placed in relation to the steam ports and passages in the valve-seat and cylinder, substantially as described, as that one series of holes shall at one stroke of the slide-valve connect the adit steam-port of the valve with the steam-passage communicating with the forward end of the cylinder, and connect the exhaust-steam port with the passage communicating with the other end of the cylinder, and vice versa on the return-stroke of the slide-valve, and that the other series of holes shall reverse the relative arrangement of adit and exhaust ports, causing on the first stroke of the valve (before referred to) the adit steam-passages of the valve and cylinder to connect through said diaphragm with the rear end of the cylinder, and the exhaust-steam ports with the forward end of the cylinder, and vice versa on the return-stroke, and an intermediate passage for connecting the opposite ends of the cylinder by a continuous passage, so that the end of the cylinder at which the steam shall be admitted and exhausted at any given stroke of the valve may be reversed by shifting the diaphragm so as to bring the other series of holes in communication with the steam passages or ports in the valve and cylinder without changing the motion of the slide-valve, substantially as described.

2. In combination with the slide-valve and piston-cylinder of a steam-engine, a perforated diaphragm interposed between the slide-valve and cylinder or valve-seat, said diaphragm having two series of holes, and a passage or groove so arranged, substantially as described, in relation to the steam ports and passages of the slide-valve and cylinder as that when one series of such holes is in communication with said steam ports and passages the steam shall be admitted and exhausted at the reverse ends of the cylinder to that at which the steam is admitted, and exhausted when the other set of holes is brought in connection with the steam ports and passages of the slide-valve and cylinder, and when both series of holes are disconnected with the adit and the exhaust the opposite ends of the cylinders shall be connected by a continuous passage, substantially as described.

3. The combination, with the piston and cylinder of a steam-engine, of the sliding valve E, having exhaust-passages $a\ a'\ a''$, the diaphragm F, perforated with two series of holes, 1 2 3 and 4 5 6 7, and the steam-cylinder having steam-passages K and $l$ communicating with its opposite ends, and branch passages $d$ and $e$ connecting with passage $l$, and $g$ and $h$ connecting with passage K, and exhaust-ports $c$, $f$, and $i$, constructed and arranged substantially as and for the purposes hereinbefore described.

In testimony whereof I have hereunto set my hand this 24th day of December, A. D. 1884.

HERMANN STEVENS.

Witnesses:
 J. W. WEHNER,
 JOHN S. KENNEDY.